(12) United States Patent
Silveira et al.

(10) Patent No.: US 9,243,711 B2
(45) Date of Patent: Jan. 26, 2016

(54) BI-DIRECTIONAL PRESSURE ENERGIZED AXIAL SEAL AND A SWIVEL CONNECTION APPLICATION

(75) Inventors: Helvecio C. K. Silveira, Sao Paulo (BR); Ivan Candiani, Sao Paulo (BR); Leonardo Cardoso, Sao Paulo (BR); Rodrigo Ferreira Dias, Sao Paulo (BR)

(73) Assignee: Vetco Gray Inc., Houston, TX (US)

( * ) Notice: Subject to any disclaimer, the term of this patent is extended or adjusted under 35 U.S.C. 154(b) by 639 days.

(21) Appl. No.: 13/337,836

(22) Filed: Dec. 27, 2011

(65) Prior Publication Data

US 2013/0020799 A1 Jan. 24, 2013

Related U.S. Application Data

(60) Provisional application No. 61/509,408, filed on Jul. 19, 2011.

(51) Int. Cl.

| | |
|---|---|
| *F16L 17/00* | (2006.01) |
| *F16J 15/08* | (2006.01) |
| *F16J 3/04* | (2006.01) |
| *E21B 21/10* | (2006.01) |
| *E21B 17/05* | (2006.01) |
| *F16L 19/08* | (2006.01) |
| *E21B 33/00* | (2006.01) |

(52) U.S. Cl.
CPC ............. *F16J 15/0887* (2013.01); *E21B 17/05* (2013.01); *E21B 21/106* (2013.01); *F16J 3/047* (2013.01); *F16L 19/08* (2013.01); *E21B 2033/005* (2013.01)

(58) Field of Classification Search
USPC ......... 277/607, 608–609, 616, 634–635, 644, 277/637; 285/917, 374, 351, 379, 375
See application file for complete search history.

(56) References Cited

U.S. PATENT DOCUMENTS

| | | | | |
|---|---|---|---|---|
| 1,889,868 | A | * | 12/1932 | Montgomery ............. 285/332.2 |
| 2,447,663 | A | * | 8/1948 | Payne ........................... 277/388 |
| 3,485,142 | A | * | 12/1969 | Allen et al. .................. 92/169.1 |
| 4,486,002 | A | * | 12/1984 | Riess et al. .................... 251/214 |
| 4,647,085 | A | * | 3/1987 | Anderson et al. ............. 285/333 |
| 4,747,606 | A | | 5/1988 | Jennings |

(Continued)

FOREIGN PATENT DOCUMENTS

JP 57171163 A * 10/1982 ............... F16J 15/32

OTHER PUBLICATIONS

Search Report from corresponding Great Britain Application No. GB1212785.8, dated Oct. 26, 2012.

*Primary Examiner* — Aaron Dunwoody
(74) *Attorney, Agent, or Firm* — Bracewell & Giuliani LLP

(57) ABSTRACT

A tubular connection has first and second tubular members having aligned bores with a common axis and having first and second seal surfaces, respectively. A metal seal has a first end portion that sealingly engages the first seal surface and a second end portion that sealingly engages the second seal surface. The metal seal has a sidewall with at least two folds. One of the folds defines an axial interior gap. The other of the folds defines an axial exterior gap. An exterior spacer member is positioned in the exterior gap to limit closer of the exterior gap in response to a greater pressure on the interior of the seal than on the exterior. An interior spacer member is positioned in the interior gap to limit closure of the interior gap in response to a greater pressure on the exterior of the seal than on the interior.

16 Claims, 5 Drawing Sheets

(56) References Cited

U.S. PATENT DOCUMENTS

| | | |
|---|---|---|
| 6,032,958 A | 3/2000 | Fowler |
| 7,762,319 B2 | 7/2010 | Nelson |
| 7,913,716 B2 * | 3/2011 | Ostergaard et al. ...... 137/614.03 |
| 2010/0147530 A1 | 6/2010 | Adamek et al. |
| 2010/0181734 A1 | 7/2010 | Halling |
| 2010/0327532 A1 | 12/2010 | Thomson |

* cited by examiner

BI-DIRECTIONAL PRESSURE ENERGIZED AXIAL SEAL AND A SWIVEL CONNECTION APPLICATION

CROSS-REFERENCE TO RELATED APPLICATIONS

This application claims priority to provisional patent application 61/509,408, filed Jul. 19, 2011.

FIELD OF THE DISCLOSURE

This invention relates in general to oil and gas well equipment and in particular to a metal-to-metal seal for sealing between tubular members and in particular between rotatable members of a swivel.

BACKGROUND

In oil and gas equipment, some may employ seals that are pressure energized; that is, fluid pressure on one side of the seal causes the sealing surfaces into greater contact with each other. For example, fluid pressure applied to the recessed or concave side of an annular cup-shaped or lip seal increases the sealing force. A lip seal does not seal against fluid pressure applied to convex side, thus it is a one-way pressure energized seal.

Many bi-directional seals are not pressure-energized. They seal due to deformation against the seal surfaces applied by setting forces during installation. They seal in both directions independently of the fluid pressure. For example, casing hanger seals in wellheads typically are not pressure energized. Often they are made of metal and permanently deformed.

An advantage to a pressure-energized seal is that it does not require a high setting force to be applied before being exposed to fluid pressure. For example, a subsea swivel connector has tubular members with aligned bores. Each tubular member has an external flange with a bolt pattern for bolting to pieces of subsea equipment. To install, the swivel connector is positioned between the subsea equipment and bolted to one piece. Then the unbolted flange is rotated until aligned with the other piece to allow the other piece to be bolted. Once bolted to both pieces, no further swivel movements are needed. A metal-to-metal seal between the two parts of the swivel would prevent the parts from rotating if it is of a permanently deformed type. Elastomeric seals between the two parts of the swivel work, however, they do not have the longevity of metal-to-metal seals.

A one-way pressure-energized metal seal between the two parts of the swivel could be employed, but has disadvantages. The internal fluid pressure in the swivel to energize the seat would occur after both parts of the swivel are made up with the two pieces of subsea equipment. Pressure-energized deformation of the metal seal would normally be elastic and below the yield strength of the metal of the lip seal. When the internal fluid pressure is removed or reduced, the contact forces between the sealing surfaces diminish. A reduction in contact forces may result in leakage of sea water from the exterior to the interior, which is detrimental. There are other applications for a two-way pressure-energized metal seal.

SUMMARY

A connection has first and second tubular members having aligned bores with a common axis having first and second seal surfaces, respectively. A metal seal has a first end portion that sealingly engages the first seal surface and a second end portion that sealingly engages the second seal surface. The metal seal has a sidewall extending between the first and second end portions, the sidewall having interior and exterior sides. The sidewall has at least one fold between the first and second end portions, defining axially spaced apart flanks and an axial gap therebetween. A spacer member is positioned in the gap to limit movement of the flanks toward each other in response to a pressure differential between the interior and exterior sides.

The spacer member may be a ring. It has an axial dimension less than the gap when there is no differential pressure between the interior and the exterior sides. The spacer member has contact surfaces that contact the flanks when the flanks move toward each other. A body portion extends from the contact surfaces in a direction away from the gap. A cylindrical skirt may be located on an end of the body portion opposite the contact surfaces.

The first seal surface may be a surface transverse to the axis, such as flat and perpendicular to the axis. The second seal surface may also be a transverse surface transverse to the axis. Alternately, the second seal surface may be a cylindrical surface concentric with the axis. A pressure differential causing movement of the flanks away from each other increases a contact pressure between the first end portion and the first seal surface. Contact pressure also increases between the second end portion and the second seal surface if the second seal surface is transverse to the axis.

In one embodiment, the seal has two folds, defining an inward facing gap exposed to fluid on the interior side of the sidewall and an outward facing gap exposed to fluid on the exterior side of the sidewall. An inner spacer member is located in the inward facing gap and an outer spacer member is located in the outward facing gap.

DETAILED DESCRIPTION OF THE DISCLOSURE

Figure 1:
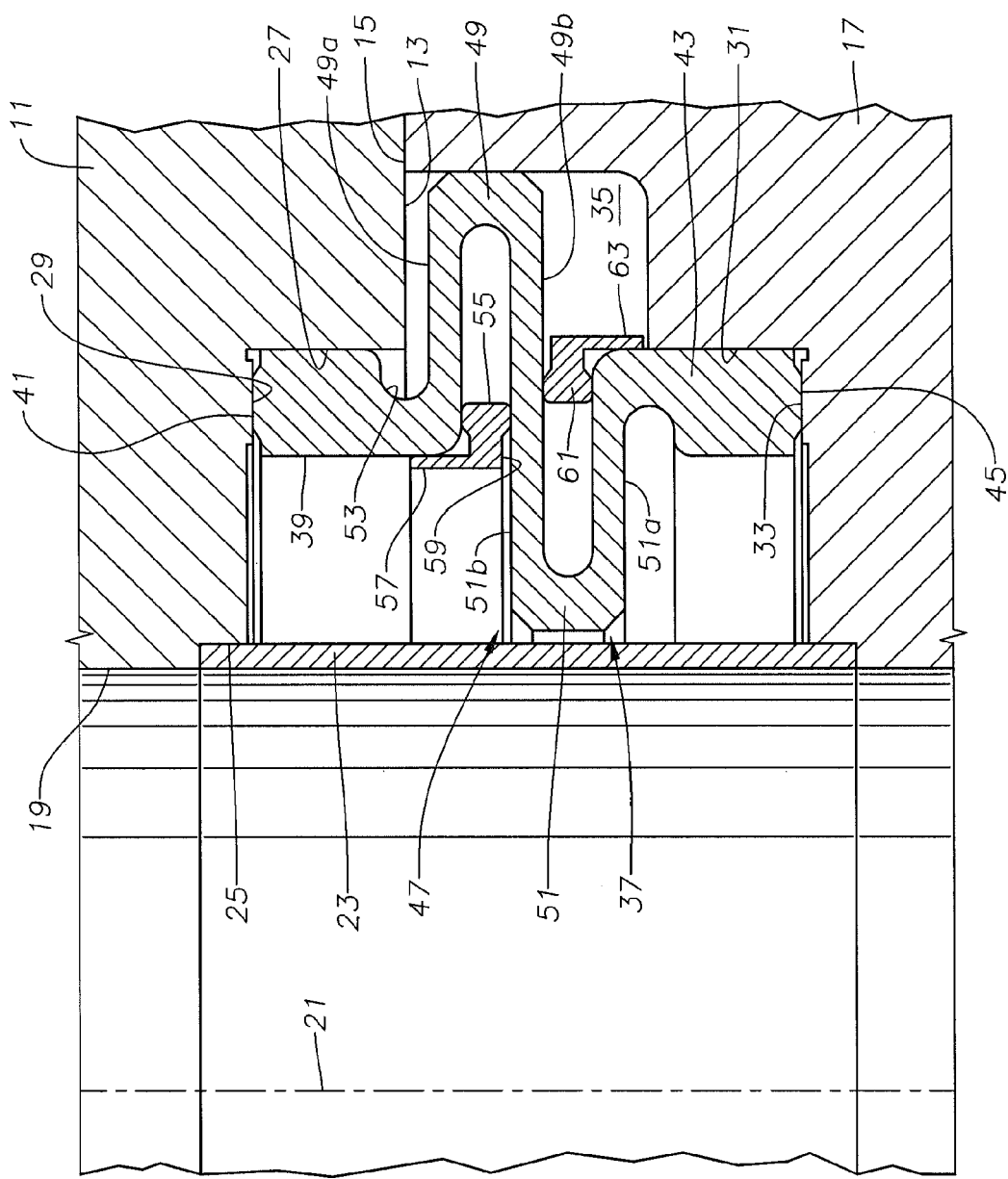
FIG. 1 is a sectional view illustrating a seal in accordance with this disclosure and shown installed between two tubular members.

Referring to FIG. 1, a first tubular member 11 has a rim 13 that is in substantial abutment with a rim 15 of a second tubular member 17. Rims 13, 15 are parallel flat surfaces in this embodiment, but they could be other shapes. Each tubular member 11, 17 has a bore 19, and bores 19 are coaxial about axis 21. In the drawing, axis 21 is oriented vertically, but it could be in other orientations, such as horizontal. A guide sleeve 23 has opposite ends engaging enlarged bore portions 25 in bores 19 to provide a uniform diameter passage through bores 19. Guide sleeve 23 may or may not seal to the enlarged bore portions 25. Guide sleeve 23 is an optional element to be used when a uniform passage and/or an auxiliary internal sealing sleeve is required for operation.

First tubular member 11 has an annular recess 27 outward from and surrounding sleeve 23. Annular recess 27 comprises a counterbore at the intersection of bore 19 and rim 13 of first tubular member 11. Annular recess 27 defines a downward facing seal surface 29 that is concentric with axis 21. In this example, seal surface 29 is a flat surface located perpendicular to axis 21; but it could be other shapes rather than a flat surface. Even radial or cylindrical sealing might be used. Similarly, second tubular member 17 has an annular recess 31 encircling sleeve 23. Recess 31 comprises a counterbore in bore 19 of second tubular member 17. Recess 31 defines a seal surface 33 that faces seal surface 29 and is also inn a plane perpendicular to axis 21 in this example. The seal surface 33 can vary in the same manner of the seal surface 29. Second tubular member 17 also has an annular cavity 35 extending from its rim 15. Cavity 35 is a counterbore at the junction of bore 19 and rim 15 of second tubular member 17 has a greater diameter than recess 31.

A seal 37 is located within recesses 27, 31 and cavity 35. Seal 37 has a first end 39 that is received within first member recess 27. First end 39 has a cylindrical exterior that is closely received or fits within the cylindrical outer wall of recess 27; however, the cylindrical exterior does not seal to the cylindrical wall. The annular recess 27 may, if required, offer radial support to the first end 39 of the seal 37. If recess 27 has no structural responsibility to support the seal 37, other geometries might be used. An axial seal surface 41 is located on first end 39 and has a mating shape to seal surface 29, which in this example is flat. Seal surface 41 may be metal to form a metal-to-metal seal with seal surface 29. Seal 37 has a second end 43 that has the same shape as first end 39 in this example, but may use alternative geometries. Second end 43 has a cylindrical exterior that is closely received or fits within the cylindrical outer wall of recess 31. This annular recess 31, similar to recess 27, may function to support the seal 37, and also its geometry might be different from the presented one. Second end 43 has a seal surface 45 that faces opposite to seal surface 41 and may be metal to form a metal-to-metal seal with seal surface 33. The seals formed by seal surfaces 41, 45 could be static; alternately, one or both could be dynamic in the event tubular members 11 and 17 are rotatable relative to each other.

Seal 37 has a bellows 47 that joins first end 39 to second end 43. Bellows 47 comprises an annular wall having undulations or corrugations. More specifically, in this embodiment, bellows 47 has an external fold 49 extending radially outward from first end 39 into cavity 35. External fold 49 includes a flank 49a extending outward from first end 39, then turning at a U-shaped 90 degree corner to define a flank 49b. In this example, flanks 49a and 49b are substantially flat, parallel with each other and in planes perpendicular to axis 21. The annular space or channel between flanks 49a, 49b is exposed to fluid on the interior of seal 37. Fold 49 is referred to as "external" herein for convenience because the outer portion of the 90 degree corner of fold 49 is on the exterior of seal 37. External fold 49 has an outer diameter measured at its corner that is greater than the outer diameters of the sealing areas in first and second ends 39, 43.

An internal fold 51 joins external fold 49 to second end 43. Internal fold 51 has a flank 51a joining and extending radially inward from second end 43. Flank 51a turns a 90 degree corner and joins a flank 51b that comprises an inner portion of flank 49b. Flanks 51a, 51b are illustrated as being flat, parallel to each other and perpendicular to axis 21. The annular space or channel between flanks 51a, 51b is in communication with fluid on the exterior of seal 37. The outer portion of the corner of internal fold 51 is on the interior side of seal 37. Internal fold 51 has an inner diameter that is less than the inner diameter the sealing areas of first and second ends 39, 43. In this embodiment, half the distance from the inner diameter of internal fold 51 to the outer diameter of external fold 49 is approximately mid-way between the inner and outer diameters of first and second ends 39, 43. To balance the contact pressure distribution on the sealing surfaces 29, 33, annular recesses 53 may be located on the exteriors of first end 39 where flank 49a begins and on second end 43 where flank 51a begins.

Folds 49, 51 in the examples have U shapes with flat planar sides for flanks 49a, 49b and 51a, 51b. However, conical flanks with an opened U or V shape may be used. Even curved sides or flanks might be employed with the same philosophy.

A spacer 55 is located between and in contact with opposing flanks 49a, 49b. One side of spacer 55 contacts flank 49a and the other contacts flank 49b at the point where flank 49b merges into flank 51b. For its installation, spacer 55 might be a snap ring or a ring split in pieces that after installation into the fold 49 can be integrated by an additional ring. Spacer 55 may has a cylindrical skirt 57 on its inner diameter or an external protrusion to limit the internal surface of the fold 49 or other geometry to guaranty the position of the spacer. Spacer 55 may have annular recesses 59 on the surfaces that contact flanks 49a and 49b. One of the recesses 59 is located at the junction of the ring portion of spacer 55 and skirt 57. The other recess 59 is on an opposite side of the ring portion. Recesses 59 decrease the radial width of the surface of spacer 55 that contacts flanks 49a, 49b. The radial width of the contacting surface of spacer 55 is smaller than the radial dimension of either flank 49a, 49b. In the example, the contacting surface between spacer 55 and flanks 49a, 49b is located approximately half way between the outer diameter of external fold 49 and internal fold 51; however selecting this location shall consider the distribution of contact pressures on the sealing surfaces 29, 33. Spacer 55 is in communication with fluid on the interior of seal 37 and does not seal to flanks 49a, 49b. Fluid on the interior side of seal 37 is free to enter the annular space between flanks 49a, 49b.

Similarly, a spacer 61 is located between flanks 51a, 51b. Spacer 61 may be a snap ring or split ring with additional integration ring. One side of spacer 61 contacts flank 51a and the other contacts flank 51b at the point where flank 51b merges into flank 49b. Spacer 61 may have a cylindrical skirt 63 on its inner diameter or an internal protrusion to limit the external surface of the fold 51 or other geometry to guaranty the position of the spacer. Spacer 61 has an inner diameter that is located approximately equidistant between inner and outer diameters of second end 43; however the selection of this location shall consider the distribution of contact pressures on the sealing surfaces. Spacer 61 may have similar annular recesses to annular recesses 59. The radial width of the portion of spacer 61 that contacts flanks 51a, 51b is smaller than the radial dimension of bellows 47 from its inner diameter to its outer diameter. The contacting portion of spacer 61 is located substantially at the entrance to the space between flanks 51a, 51b. Spacer 61 is in communication with fluid on the exterior of seal 37 and does not seal to flanks 51a, 51b.

Spacers 55, 61 have axial thicknesses defined to guarantee a precise gap between the spacer and the walls or flanks of folds 49, 51 after installation and before internal or external fluid pressure is applied. The axial thicknesses can be achieved by specifying precise dimensions to be obtained in the manufacture of spacers 55, 61. Alternately, spacers 55, 61 could be made of materials soft enough to plastically deform in thickness during installation but before internal or external fluid pressures are applied. For example, the material of spacers 55, 61 could be a metal having less hardness than the hardness of seal 37.

Before installing seal 37 between tubular members 11, 17, the axial distance from seal surface 41 to seal surface 45 will be greater than the final axial distance between seal surfaces 29, 33 when made up. Thus, when seal 37 is installed and tubular members 11, 17 are secured together, a compressive load will be applied to seal 37 along axis 21. The compressive load is less than the yield strength of seal 37, thus the deflection of seal 37 once installed is elastic, not permanent. The amount of this compressive load shall be sufficient to form an initial metal-to-metal contact pressure between surfaces 29, 41 and between surfaces 33, 45. However, the compressive load is preferably not high enough to handle sealing against the ultimate pressures expected. Depending upon the application, seal 37 could be subsequently exposed to interior fluid pressure from fluid in bores 19 or to exterior fluid pressure on the exterior of tubular members 11, 17. In some applications, such as for subsea equipment, the fluid pressure could be on both the interior and the exterior of seal 37. The fluid pressure may be greater in the interior or it may be greater on the exterior. Whether the fluid pressure is on the exterior or interior, if at a low enough pressure, the contact bearing load established by the axial deflection of seal 37 should prevent leakage.

Seal 37 becomes pressure energized by exposure to higher pressures than the low pressures mentioned. The higher pressures enhance the sealing capabilities of seal 37. For example, when sufficient internal fluid pressure in excess of any external fluid pressure is applied to the internal surfaces of seal 37, external fold 49 will tend to deform, with flanks 49a and 49b moving apart from each other, thereby tending to increase the axial length of seal 37. Because tubular members 11, 17 do not move apart from each other, this effect will result in an increase of the axial load of sealing surfaces 41, 45, improving the contact pressure at the sealing surfaces 41, 45. The internal fluid pressure also acts on internal fold 51, but the effect would be the opposite. The internal fluid pressure tends to bring flanks 51a, 51b closer together, tending to reduce the axial length of seal 37 and reduce the contact pressure at seal surfaces 41, 45. Without spacers 55, 61, the total net effect of internal fluid pressure would lead to a negligible increase or even a decrease of the contact pressure at seal surfaces 41, 45. Consequently, without spacers 55, 61, bellows 47 would not bring a satisfactory increase in contact pressure in response to an increase in interior or exterior fluid pressure.

However, with the inclusion of spacers 55, 61, the negative effect of the internal pressure on internal fold 51 is limited. Some amount of deformation will occur in internal fold 51 due to internal pressure causing flanks 51a and 51b to move toward each other. However, the movement will cease once the gaps between spacer 61 and flanks 51a, 51b are closed. As discussed above, spacer 55 does not prevent flanks 49a, 49b from moving apart from each other due to internal pressure, thereby increasing the gaps between spacer 55 and flanks 49a, 49b. This movement enhances the contact bearing load at seal surfaces 41, 45. The enhancement due to the gaps increasing in external fold 49 is greater than the slight negative effect due to gaps closing in internal fold 51 between spacer 61 and flanks 51a, 51b. The net effect of internal pressure would thus be to increase the contact forces at seal surfaces 41, 45. With a careful definition of the geometry of bellows 47 and spacers 55, 61, a reasonable positive effect can be achieved on the contact bearing loads. The pressure energizing occurs whether there is internal flow in bore 19 from first tubular member 11 toward second tubular member 17 or vice-versa. Thus seal 37 is bi-directional.

The same explanation is fully applicable to the action of the external pressure on seal 37. External pressure would tend to beneficially move flanks 51a, 51b apart from each other. The same external pressure would tend to move flanks 49a, 49b toward each other, but this movement ceases once spacer 55 contacts flanks 49a, 49b. As a result, seal 37 can have the contact bearing pressure on its sealing surfaces 41, 45 increased by the action of internal or external pressure or by the resultant differential pressure between them.

As discussed above, seal surfaces 29, 41 and 33, 45 can vary in shape other than the flat surfaces shown. In addition to flat, the seal surfaces may have a trapezoidal geometry like API BX type gaskets. The seal surfaces may comprise radial sealing surfaces, double radial sealing surfaces like U-shaped seals, conical sealing surfaces, spherical sealing surfaces, toroidal sealing surfaces, or other shapes. It is not required that seal surfaces 29, 41 have the same shape as seal surfaces 33, 45. One of the seal surfaces 29, 41, as example, can be static and the other seal surfaces 33, 45 dynamic; in that one surface 33, 45 is rotatable relative to the other surface 33, 45. If the static sealing surfaces require a seating load greater than bellows 47 offers, additional means can be employed to increase the seat load for the static seal independently. One solution would be to bolt or thread the end 39 or 43 of the static seal portion against its sealing seat piece. The dynamic seal side 39 or 43 can have flat sealing surfaces as described or more elaborate geometries. The sealing surfaces at one or both ends 39 or 43 can yet use elastomeric or elastomeric seal elements.

Figure 2:
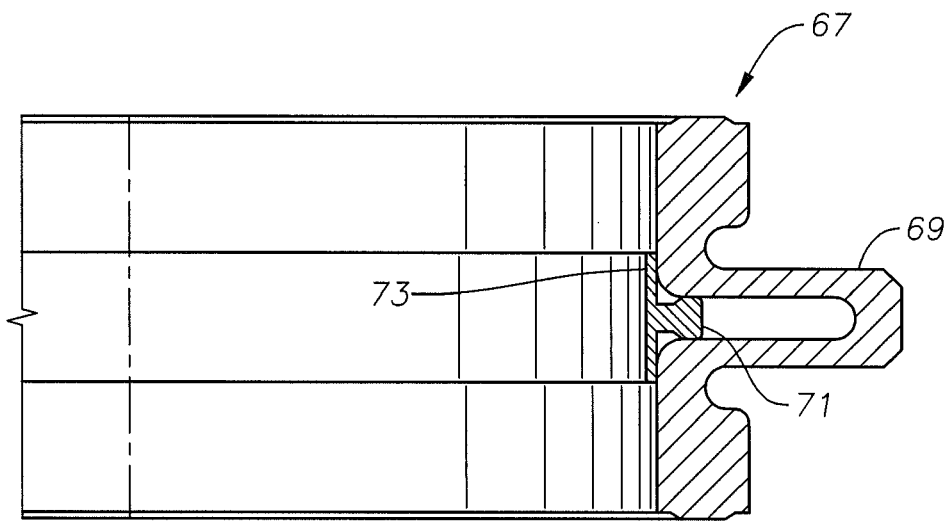
FIG. 2 is a quarter sectional view of a first alternate embodiment of the seal of FIG. 1.

In FIG. 1, seal 37 has two folds 49, 51, one internal and one external. However, the concept is applicable to any possible quantity of folds. A spacer is useful for even a one-fold seal. For example, FIG. 2 shows a seal 67 having a configuration similar to seal 37 (FIG. 1), except bellows 69 has only a single fold. In this instance, the single fold is external with the outer portion of its corner being on an exterior side of seal 69. Also, the outer diameter of bellows 69 is greater than the outer diameters of the ends of seal 67. A spacer 71 is located between the flanks of bellows 69. Spacer 71 may have a skirt 73 on its inner diameter extending into contact with inner diameters of both ends of seal 67. The outer diameter of spacer 71 is approximately equidistant between inner and outer diameters of the ends of seal 67. As in FIG. 1, spacer 71 does not seal to bellows 69, allowing fluid to flow into the interior of bellows 69 between its flanks.

If internal fluid pressure in excess of any external fluid pressure is applied to seal 67, the fluid pressure will tend to move the flanks of bellows 69 apart from each other. This tendency to lengthen seal 67 increases the contact pressure of the ends of seal 67 against sealing surfaces. If external fluid pressure is applied that is greater than internal pressure, the effect would be to move the flanks of bellows 69 toward each other, decreasing the contact bearing stress. However, the gaps between spacer 71 and the flanks of bellows 69 would limit the contracting movement. In the embodiment of FIG. 2, external pressure does not enhance the contact bearing load, but it does not significantly decrease it either. In FIG. 1, because it has two bellow folds, external pressure enhances the contact bearing load as well as internal pressure.

Figure 3:
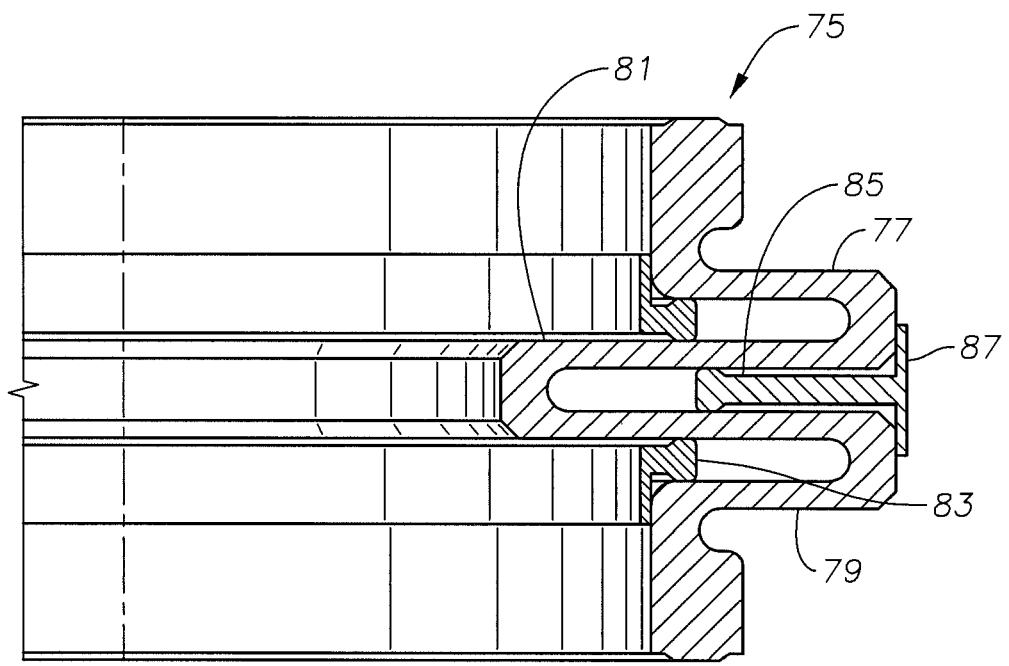
FIG. 3 is a sectional view of a second alternate embodiment of the seal of FIG. 1.

The quantity of folds and their geometry can be variable and their design shall target the required leak-tightness and shall regard the prescribed design and operational conditions (pressures, temperatures, environments, required displacements, etc.) FIG. 3 illustrates another embodiment, wherein seal 75 has two external folds 77, 79 and one internal fold 81 located between. Spacers 83 are positioned between the flanks of external folds 77, 79 on the interior side of seal 75. Spacers 83 are similar in configuration to spacer 55 of FIG. 1, which is L-shaped in cross-section. A spacer 85 is located on the exterior of seal 75 between the flanks of internal fold 81. Spacer 85 has a skirt 87 extending in opposite directions, similar to the configuration of spacer 73 of FIG. 2, which is T-shaped in cross section. Spacer 85 has a longer width between its inner diameter and skirt 87 in order to place its inner diameter mid-way between the inner and outer diameters of the ends of seal 75.

Figure 4:
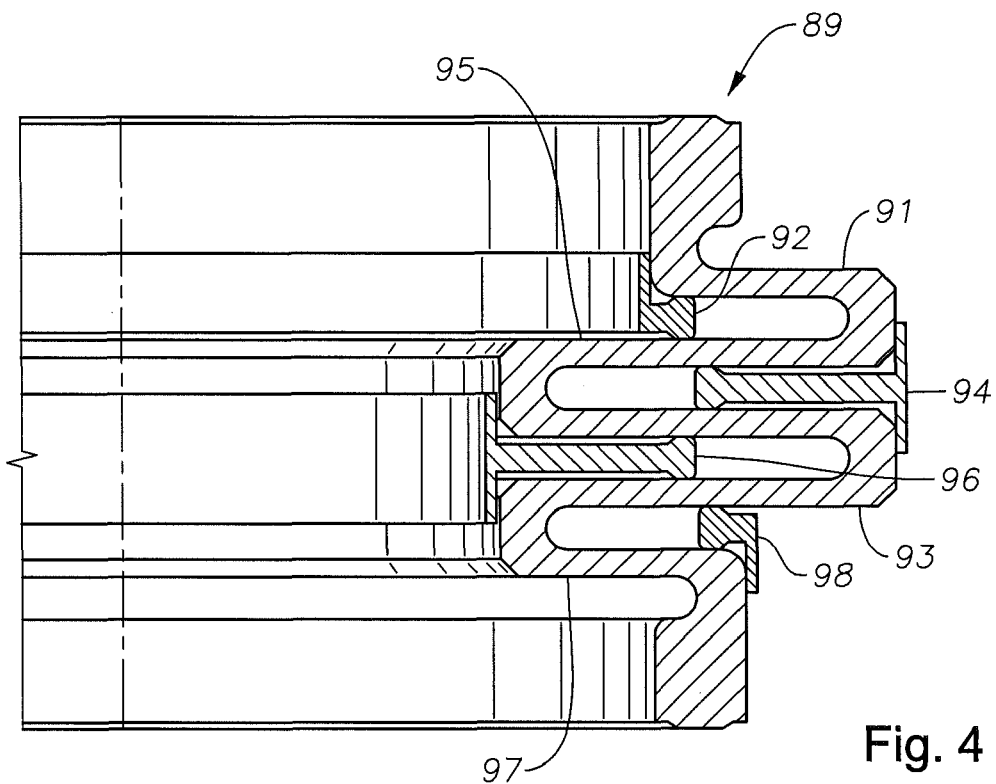
FIG. 4 is a sectional view of a third embodiment of the seal of FIG. 1.

FIG. 4 illustrates a seal 89 having two external folds 91, 93 and two internal folds 95, 97. A spacer 92 similar to the L-shaped spacer 55 in FIG. 1 is located between the flanks of external fold 91 on the interior side of seal 89. A T-shaped spacer 94 is located between the flanks of internal fold 95 on the exterior of seal 89. Another T-shaped spaced 96 is located between the flanks of external fold 93 on the interior of seal 89. Another L-shaped spacer 98 is located between the flanks of internal fold 97 on the exterior of seal 89. The inner diameters of spacers 94, 98 and the outer diameters of spacers 92, 96 are located mid-way between the inner and outer diameters of the ends of seal 89.

Figure 5:
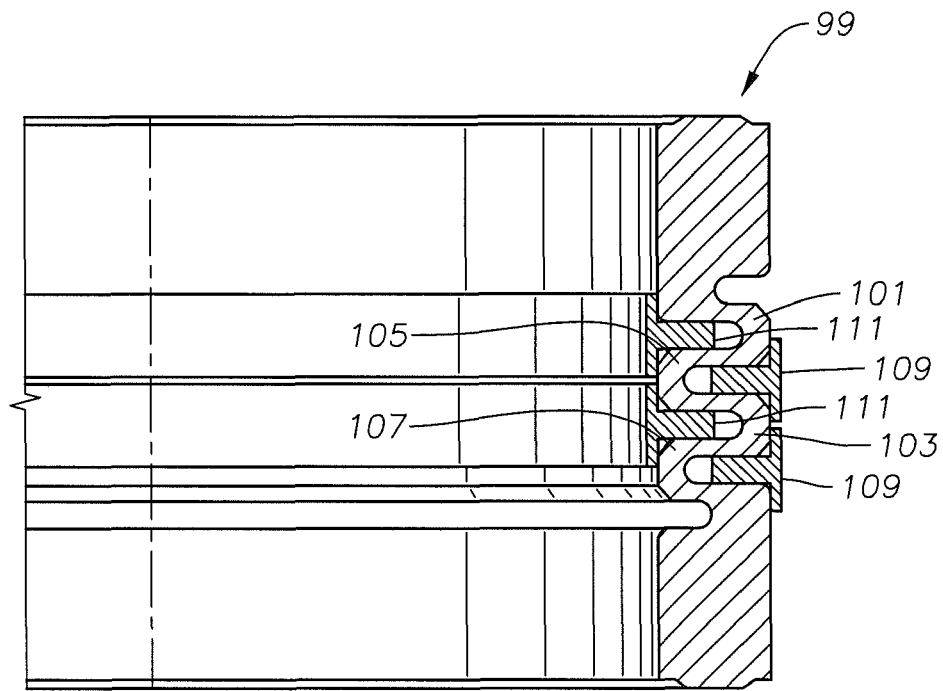
FIG. 5 is a sectional view of a fourth embodiment of the seal of FIG. 1.

FIG. 5 illustrates a seal 99 having external folds 101, 103 and internal folds 105, 107. In this embodiment, the outer diameters of external folds 101, 103 are the same as the outer diameters of the ends of seal 99. Similarly, the inner diameters of internal folds 105, 107 are the same as the inner diameters of the ends of seal 99. Seal 99 is similar to seal 89 of FIG. 4, except the radial width of the bellows in FIG. 5 is the same as the widths of the ends. In FIG. 4, the radial width of the bellows is greater than the radial widths of the ends. Two spacers 109 are located on the exterior of seal 99, and two spacers 111 are located on the interior of seal 99.

Figure 6:
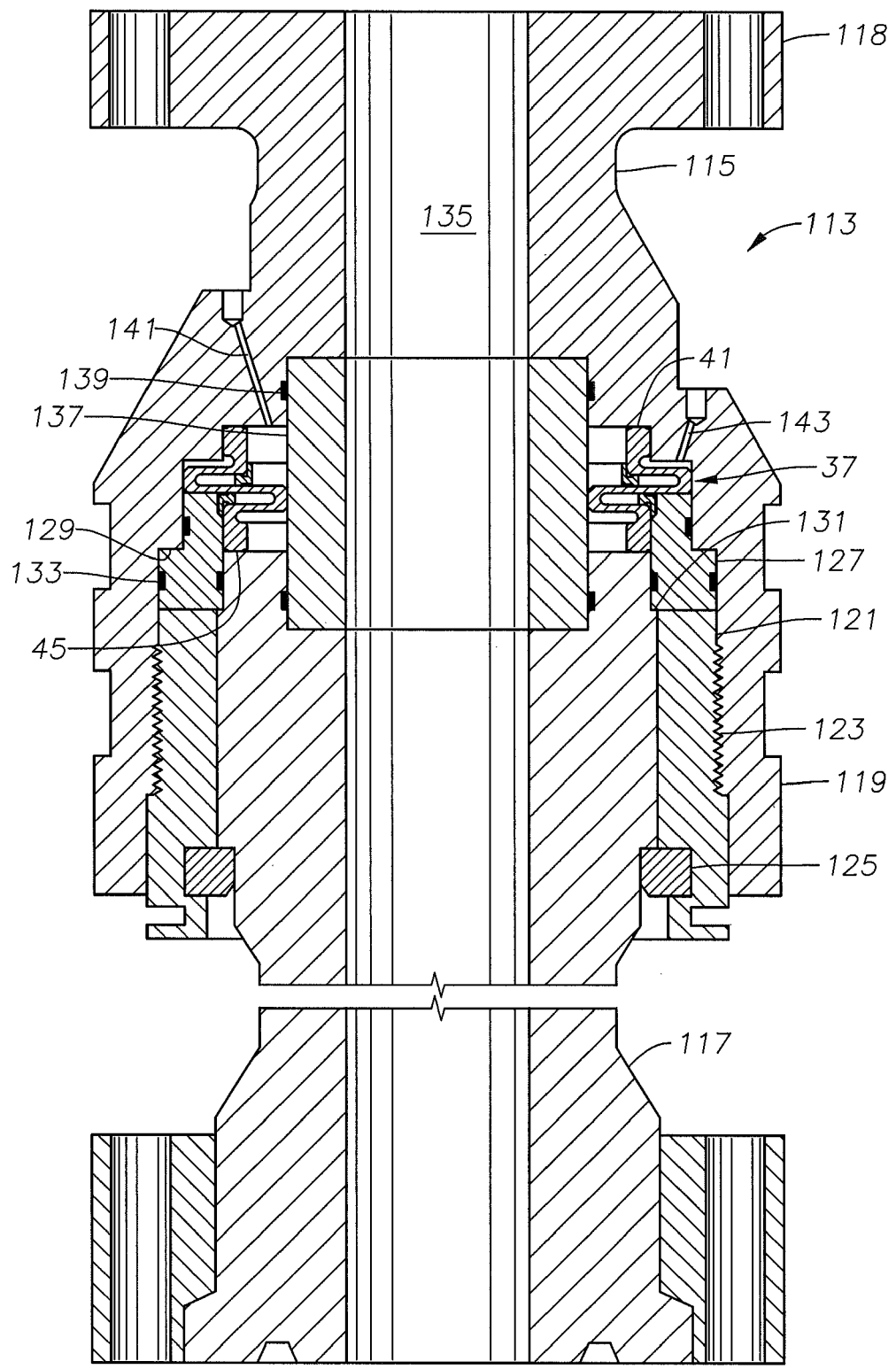
FIG. 6 is a sectional view of a swivel employing the seal of FIG. 1.

FIG. 6 illustrates an application of seal 37 of FIG. 1 installed within a swivel connection 113. Swivel 113 may have a variety of uses involving offshore oil and gas drilling and production. For example, it may be at the top side of a riser column for drilling mud transfer. Swivel 113 may be located subsea for connecting a flow line to subsea equipment located on the sea floor. The main purpose of swivel 113 is to avoid torsion when connecting a flow line to another piece of equipment or early production systems. Swivel 113 has a first tubular member 115 that mounts to a second tubular member 117 so that rotation can take place between them. The rotation normally takes place during the installation, and once installed, rotation between tubular member 115 and tubular member 117 does not occur. Although first tubular member 115 is illustrated above second tubular member 117, swivel may be oriented in a variety of directions, including horizontally.

Each tubular member 115, 117, in the example, has a flange 118 on its end with bolt holes for fastening swivel 113 between one piece of equipment and a flow line. However, the connection of the tubular members can be performed by other means, such as welding or threading the connections. First tubular member 115 has a receptacle 119 that slides over a portion of second tubular member 117. In this embodiment, receptacle 119 includes an internal bearing sleeve 121 secured by threads 123. Bearing sleeve 121 is rotatable relative to second tubular member 117. A retainer ring 125, which may be in segments, such as three pieces, holds bearing sleeve 121 to second tubular member 117. A bearing ring 127 mounts on a shoulder 131 on second tubular member 117. A shoulder 129 in receptacle 119 engages an opposite side of bearing ring 127. Bearing ring 127 may have auxiliary seals 133 in engagement with outer diameter portions of second tubular member 117 and inner diameter portions of receptacle 119.

A bore 135 extends through first and second tubular members 115, 117. A sleeve 137 joins bore 135 in first tubular member 115 with bore 135 in second tubular member 117, providing a uniform passage through bores 135. Sleeve 137 may have auxiliary seals 139 between its outer diameter and inner diameter portions of first and second tubular members 115, 117.

Metal-to-metal seal 37 of FIG. 1 is installed between receptacle 119 and second tubular member 117. First end seal surface 41 is in sealing engagement with receptacle 119. Second end seal surface 45 is in sealing engagement with second tubular member 117. One or both of the sealing engagements becomes dynamic when one of the tubular members 115, 117 rotates relative to the other. A port 143 may be considered to access the chamber between the first tubular member 115 and the exterior side of seal 37. Another port 141 may be considered to allow access to the chamber between the first tubular member 115, the interior side of seal 37 and the exterior side of sleeve 137. Test pressure may be introduced into ports 141, 143 to test the sealing engagement of seal 37 before swivel 113 is installed.

Preferably, seal 37 should not be pressure energized when swivel 113 undergoes torque resulting in rotation of one tubular body 115, 117 relative to the other. To facilitate the rotation, the operator would avoid a differential pressure between the internal and external sides of seal 37 when swivel 113 is being connected to equipment, which is normally when it would encounter torque. The installation operation of subsea equipment may require the internal bore 135 flooded (with bore opened to the external environment pressure) or empty (with air at atmospheric pressure without opening to external environment). To guarantee that the seal 37 will be pressure balanced during the equipment installation no matter if the bore is empty or flooded, the seal might be isolated by auxiliary seals 139 on the internal side of seal 37 and auxiliary seals 133 on the external side of seal 37.

Depending on the resistance of internal auxiliary seal 139 material to the operational bore environmental conditions, at some time during operation, these seals 139 may allow a leakage and the high pressure fluid applied in bore 135 may communicate past auxiliary seals 139 and come into contact with the interior side of seal 37. This high pressure is typically greater than any pressure on the exterior of seal 37 and causes seal 37 to energize with greater bearing contact forces at seal surfaces 41, 45. The higher pressure in bore 135 than pressure on the exterior of swivel 113 exerts a tensile force tending to push tubular members 115, 117 apart from each other. Retainer ring 125 is thus subjected to tensile forces.

Depending on the resistance of seal 133 material to the external environmental conditions, these seals 133 may leak. If the pressure is bore 135 is reduced to a level far below the hydrostatic pressure of the sea acting on auxiliary seals 133, this external pressure may communicate past auxiliary seals 133 and act on the exterior side of seal 37. This pressure differential causes seal 37 to energize with greater axial forces at seal surfaces 41 and 45.

Figure 7:
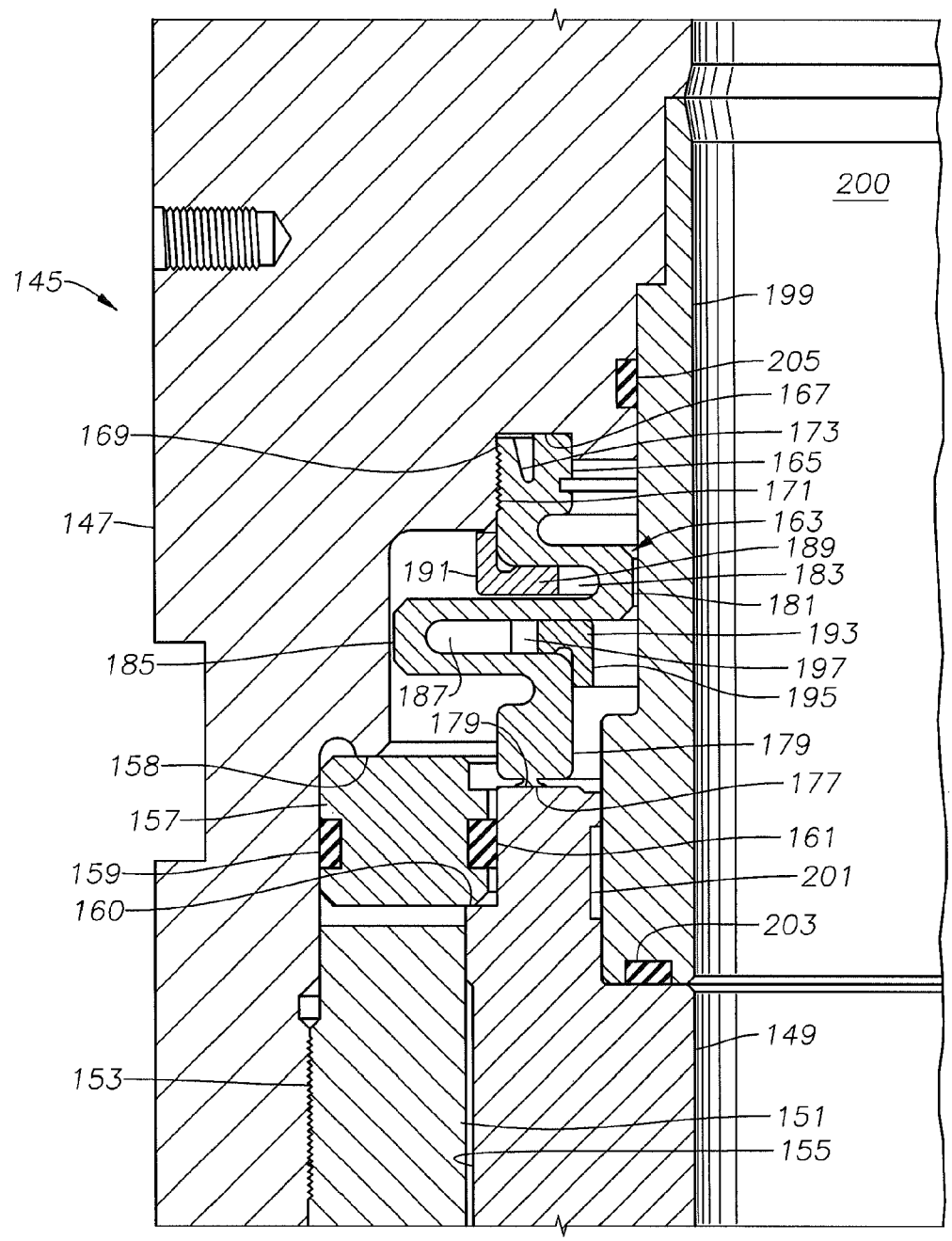
FIG. 7 is a quarter sectional view of a fifth embodiment of the seal of FIG. 1.

Referring to FIG. 7, a portion of a swivel 145 is shown. Swivel 145 has a first or upper member 147 comprising a receptacle that fits over a portion of a second or lower member 149. As in the other embodiments, the terms "upper" and "lower" are purely arbitrary. In practice, swivel 145 could be inverted from the position shown or installed horizontally. A sleeve 151 is secured to the inner diameter of the receptacle portion by threads 153. An annular recess 155 on the outer side of lower member 149 reduces rotational friction between sleeve 151 and lower member 149. A bearing 157 is located between a downward facing shoulder 158 of upper member 147 and an upward facing shoulder 160 of lower member 149. Bearing 157 has an inner diameter elastomeric seal 161 that seals against a cylindrical portion of lower member 149. Bearing 157 has an outer diameter elastomeric seal 159 that seals against the inner diameter of the receptacle portion of upper member 147.

Metal seal 163 has an upper end portion 165 that statically engages a flat stop surface 167 in upper member 147. Metal seal 163 has a radial seal surface 169 that is biased outward into sealing engagement with a cylindrical surface 171 in upper member 147. An annular recess 173 in the upper side of upper end portion 165 defines a leg for radial seal surface 169, enabling elastic deformation so that radial seal surface 169 is biased against cylindrical surface 171.

Metal seal 163 has a lower end portion 175 with an axial seal surface 177 on its lower surface. Axial seal surface 177 is in sealing engagement with an upper surface 179 of lower member 149, and is capable of maintaining contact while lower member 149 is rotated relative to upper member 147 during installation. Upper surface 179 is flat in this example.

Seal 163 has an upper fold 181 in its sidewall between end portions 165 and 175. In this example, upper fold 181 protrudes inward, defining an exterior gap 183 that leads to the exterior of seal 163. A lower fold 185 protrudes outward, defining an interior gap 187 that leads to the interior of seal 163.

An exterior spacer 189 is located in exterior gap 183 between the flanks of upper fold 181. Exterior spacer 189 may have a cylindrical skirt 191 on its outboard edge. Skirt 191 extends upward in engagement with a cylindrical exterior portion of upper end portion 165. An interior spacer 193 is located in interior gap 187 between the flanks of lower fold 185. Interior spacer 189 may have a cylindrical skirt 195 on its inboard edge. Skirt 195 extends downward in engagement with a cylindrical interior portion of lower end portion 175. Interior spacer 189 may recesses 197 on its outboard edge.

A tube 199 extends between bores 200 of upper and lower members 147, 149. Tube 199 optionally may have a cylindrical recess 201 on a portion that fits within lower member 149 to reduce rotational friction. Tube 199 has a seal 203 with a downward facing surface sealingly engaging an upward facing surface on lower member 149. A seal 205 seals between bore 200 of upper member 147 and an exterior cylindrical portion of tube 199.

During installation, when members 147, 149 are rotated relative to each other, radial seal 169 preferably remains in static engagement with cylindrical surface 171. Axial seal 177 slides on flat seal surface 179 as there is less initial contact force between axial seal 177 and seal surface 179 than between radial seal 169 and cylindrical surface 171. After the connection of swivel 145 is complete, internal fluid pressure may be applied to bore 200 to a level greater than the hydrostatic fluid pressure if swivel 145 is subsea. If either tube seal 203, 205 begins to leak eventually, the differential of fluid pressure in bore 200 over hydrostatic sea water pressure will cause internal gap 187 to axially increase and external gap 183 to decrease. Exterior spacer 189 will stop the decrease in external gap 183, resulting in a net increase in contact force between axial seal 177 and axial seal surface 179. The contact force between upper end portion 165 and stop surface 167 also increases, but this interface is not intended to seal. Any leakage of fluid pressure in bore 200 past tube seals 203, 205 will further energize radial seal 169, increasing its contact force against cylindrical surface 171.

In the event either bearing seal 159, 161 leaks, and if the hydrostatic fluid pressure is greater than the fluid pressure in bore 200, that pressure differential will increase exterior gap 183. That pressure also decreases interior gap 187, however, the amount of decrease is limited by interior spacer member 193. The net effect of the external leak would be to increase the contact force of axial seal member 177. External leakage at a pressure level greater than the fluid pressure in bore 200 does not increase the contact force of radial seal surface 169. However, the outward bias force of radial seal surface 169 is adequate to withstand leakage from the exterior.

The concept presented can be used whenever a bidirectional pressure energized seal is required. Additionally, it is particularly useful for applications involving metal-to-metal sealing in dynamic or partially dynamic applications. In addition to swivel connections, valves are other possible applications. In gate valves or ball valves, the seats can use seals of this concept. The seat would be one member, the valve body the other, and the bi-directional metal seal located between them. This will lead to full metal-to-metal sealing in both seat to gate (or ball) and seat to valve body engagements. At the same time, it will also permit obtaining double sealing effect. The seats would seal on the gate (or ball) from both sides and, as a result, the sealing of both seats on gate (or ball) can be considered as effective barriers.

The invention claimed is:

1. A pressure-energized seal for sealing between first and second members, comprising:
   a metal seal having an axis, a first end portion for sealingly engaging a first member seal surface, and a second end portion for sealingly engaging a second member seal surface;
   the metal seal having a sidewall extending between the first and second end portions, the sidewall having interior and exterior sides, the sidewall having at least one inner fold and at least one outer fold between the first and second end portions, the inner fold having an inner diameter closer to the axis than an inner diameter of the outer fold, each of the folds having axially spaced apart flanks and an axial gap therebetween, the flanks of each of the folds being parallel with each other and perpendicular to the axis while there is no pressure differential between the interior and exterior sides of the seal, the gap between the flanks of the inner fold having an open outer end on the exterior side of the seal, and the gap between the flanks of the outer fold having an open inner end on the interior side of the seal; wherein
   internal fluid pressure greater than external fluid pressure acting on the seal urges the flanks of the outer fold to flex away from each other to enhance sealing of at least one of the end portions;
   internal fluid pressure greater than external fluid pressure acting on the seal also urges the flanks of the inner fold to flex toward each other;
   external fluid pressure greater than internal fluid pressure acting on the seal urges the flanks of the inner fold to flex away from each other to enhance sealing of at least one of the end portions;
   external fluid pressure greater than internal fluid pressure acting on the seal also urges the flanks of the outer fold to flex toward each other;
   an outer spacer being positioned in the gap of the inner fold in contact with both of the flanks of the inner fold to limit movement of the flanks of the inner fold toward each other when the internal fluid pressure is greater than the external fluid pressure; and wherein the outer spacer is configured and positioned so as to be in non sealing engagement with the flanks of the inner fold.

2. The seal according to claim 1, wherein the outer spacer comprises:
a ring having contact surfaces protruding from upper and lower sides for engaging both of the flanks of the inner fold;
a skirt on an outer diameter of the ring, the skirt having an end that extends axially past the open end of the gap of the inner fold in contact with the exterior side of the seal;
recesses on the upper and lower sides of the ring between the contact surfaces and the skirt.

3. The seal according to claim 1, wherein:
the outer spacer comprises a metal ring that is free of any attachment to the seal.

4. The seal according to claim 1, wherein the outer spacer comprises:
contact surfaces protruding from opposite sides of the spacer that contact both of the flanks of the inner fold when the flanks of the inner fold move toward each other;
a body portion extending within the gap of the inner fold from the contact surfaces in a direction toward the open end of the gap of the inner fold;
a skirt on an outer diameter of the ring, the skirt having an end that extends axially past the open end of the gap of the inner fold in contact with the exterior side of the seal; and wherein
the skirt is located on an end of the body portion and radially spaced from the contact surfaces.

5. The seal according to claim 4, wherein:
the skirt has an axial length greater than an axial distance from one of the contact surfaces to the other of the contact surfaces.

6. The seal according to claim 1, further comprising:
an inner spacer positioned in the gap of the outer fold in contact with both of the flanks of the outer fold to limit movement of the flanks of the outer fold toward each other when the external fluid pressure is greater than the internal fluid pressure; and
wherein the inner spacer is configured and positioned so as to be in non sealing engagement with the flanks of the outer fold.

7. The seal according to claim 6, wherein:
the inner spacer is free of any attachment to the seal.

8. The seal according to claim 6, wherein:
the second end portion has a sealing surface that is cylindrical and concentric with the axis.

9. The seal according to claim 1, further comprising:
an inner spacer positioned in the gap of the outer fold and in contact with both of the flanks of the outer fold to limit movement of the flanks of the outer fold toward each other when the external fluid pressure is greater than the internal fluid pressure; and
wherein the inner spacer is configured and positioned so as to be in non sealing engagement with the flanks of the outer fold;
a skirt on the inner diameter of the inner spacer, the skirt having an end that extends axially past the open end of the gap of the outer fold in contact with the interior side of the seal;
recesses on the upper and lower sides of the inner spacer between flank contact surfaces of the inner spacer and the skirt.

10. A pressure-containing apparatus, comprising:
first and second members having first and second seal surfaces, respectively;
a metal seal having an axis, a first end portion that sealingly engages the first seal surface and a second end portion that sealingly engages the second seal surface;
the metal seal having a sidewall extending between the first and second end portions, the sidewall having interior and exterior sides, the sidewall having at least one fold between the first and second end portions, defining axially spaced apart flanks and an axial interior gap therebetween, the interior gap leading to an interior of the seal;
at least one spacer, the spacer comprising an inner spacer positioned in the interior gap, the inner spacer having contact surfaces that are in non sealing engagement with the flanks to limit movement of the flanks toward each other; wherein
the inner spacer has an inner diameter that is spaced radially from sealing engagement with any portion of either of the first or the second members; and
the inner spacer has a coaxial cylindrical skirt located inward from an entrance of the interior gap, the skirt having an end that extends axially past the entrance of the interior gap into contact with the interior side of the sidewall adjacent the interior gap.

11. The apparatus according to claim 10, wherein the inner spacer comprises:
a body, the contact surfaces being located on an outboard portion of the body, and the skirt being located on an inboard portion of the body; and
recesses on upper and lower sides of the body, the recesses extending inward from the contact surfaces to the inboard portion of the inner spacer.

12. The apparatus according to claim 10, wherein:
the contact surfaces on the inner spacer protrude from upper and lower sides of the inner spacer.

13. The apparatus according to claim 10, wherein:
the inner spacer is formed of metal.

14. The apparatus according to claim 10, wherein:
the second end portion has a cylindrical seal surface concentric with the axis.

15. The apparatus according to claim 10, wherein:
said at least one fold comprises two of the folds, and the seal further comprises:
an axial exterior gap leading to the exterior of the seal;
the at least one spacer further comprises an outer spacer located in the outward facing gap;
the outer spacer has an outer diameter that is spaced radially from sealing engagement with any portion of either of the first or the second members; and
the outer spacer has a coaxial cylindrical skirt located outward from an entrance of the exterior gap, the skirt of the outer spacer having an end that extends axially past the entrance of the exterior gap into contact with the exterior side of the sidewall adjacent the exterior gap.

16. A tubular connection, comprising:
first and second tubular members having aligned bores with a common axis having first and second seal surfaces, respectively, one of the tubular members having a receptacle that receives a cylindrical portion of the other tubular member;
a metal seal having a first end portion that sealingly engages the first seal surface and a second end portion that sealingly engages the second seal surface;
the metal seal having a sidewall extending between the first and second end portions, the sidewall having interior and exterior sides, the sidewall having at least two folds between the first and second end portions, one of the folds defining axially spaced apart flanks and an axial interior gap therebetween leading to an interior of the seal, and the other of the folds defining axially spaced apart flanks and an axial exterior gap therebetween leading to an exterior of the seal;

an exterior spacer positioned in the exterior gap, the exterior spacer comprising a metal ring with upper and lower contact surfaces that contact the flanks of the exterior gap to limit movement of the flanks defining the exterior gap toward each other, the contact surfaces of the exterior spacer being in non sealing engagement with the flanks defining the exterior gap and in non sealing engagement with either of the first and second members; and an interior spacer positioned in the interior gap, the interior spacer comprising a metal ring with upper and lower contact surfaces that contact the flanks of the interior gap to limit movement of the flanks defining the interior gap toward each other, the contact surface of the interior spacer being in non sealing engagement with the flanks defining the interior gap and in non sealing engagement with either of the first and second members.

\* \* \* \* \*